United States Patent [19]

Nomoto et al.

[11] 4,001,503
[45] Jan. 4, 1977

[54] TEMPERATURE-RISE PREVENTIVE APPARATUS FOR TELEVISION RECEIVER PARTS

[75] Inventors: Yoshihisa Nomoto, Tokyo; Shigeru Takegami, Yokohama; Koichi Nakakubo, Yokohama; Takao Yoneyama, Yokohama, all of Japan

[73] Assignee: Hitachi, Ltd., Japan

[22] Filed: Oct. 15, 1974

[21] Appl. No.: 514,953

[30] Foreign Application Priority Data

Oct. 16, 1973 Japan ............................ 48-116178

[52] U.S. Cl. .................... 358/243; 178/DIG. 29; 315/10; 315/30
[51] Int. Cl.² ................ H04N 5/44; H01J 31/26; H01J 29/52
[58] Field of Search ............... 178/7.5 R, DIG. 14, 178/7.5 DC, 7.3 R, 7.3 DC; 315/10, 30, 31 TV; 358/39, 64; 317/40 R, 41

[56] References Cited

UNITED STATES PATENTS 3,564,137  2/1971  MacIntyre et al. ................ 178/7.5

OTHER PUBLICATIONS

*McGraw–Hill Encyclopedia of Science and Technology*, McGraw–Hill Inc., 1971, pp. 577–578.

*Primary Examiner*—John C. Martin
*Attorney, Agent, or Firm*—Craig & Antonelli

[57] ABSTRACT

Temperature-rise detecting device and average beam current restricting device operable in response to the former device are provided in television receiver set. Temperature in the television receiver may be kept below a predetermined temperature by reducing the average beam current when the temperature in the television receiver set rises. This results in the lowering of the maximum rated temperature for the parts used in the fly-back transformer, the high voltage rectifier, etc.

13 Claims, 3 Drawing Figures

TEMPERATURE-RISE PREVENTIVE APPARATUS FOR TELEVISION RECEIVER PARTS

The present invention relates to a temperature-rise preventive apparatus for the television receiver parts, capable of preventing the parts in the television receiver set from being damaged by temperature-rise.

Temperature in the television receiver rises with time when the receiver is switched on. This is due to the heat evolved when the current flows through these parts. For this, temperature in the television receiver is higher than the television outside temperature. The maximum television outside temperature permitting the normal operation of the television receiver set without damage of the television parts, is determined by the maximum rated temperature of the television parts used whose rated temperature are much lower. Generally, the television parts with small maximum rated temperature are greatly affected by the current flowing through the such television parts per se, e.g. the beam current of the cathode ray tube. Such parts with small maximum rated temperature and tending to be heated by the beam current flowing therethrough are as follows: fly-back transformer, transistor for controlling a constant voltage source, reactor for keeping a high voltage constant, high voltage rectifier diode, and power source transformer. Those television parts are more expensive than other television parts such as capacitors, resistors, and which also have larger maximum rated temperature. Further, these parts are larger in size as their maximum rated temperature is larger.

Accordingly, an object of the present invention is to provide a temperature-rise preventive apparatus for the television parts, by which the use of lower cost television parts such as fly-back transformer, high voltage rectifier diode, etc. are enabled without the need of the lowering of the maximum television outside temperature permitting the normal operation of television receiver.

Another object of the present invention is to provide a temperature-rise preventive apparatus for the television parts, by which the use of smaller sized television parts such as fly-back transformer, high voltage rectifier diode, etc. are enabled without the need of the lowering of the maximum television outside temperature permitting the normal operation of television receiver set.

To achieve these objects, the present invention constitutes a temperature-rise preventive apparatus for the television parts comprising: a temperature-rise detecting device including a thermal variable resistor provided in the television receiver and producing an output signal in accordance with the resistance variation of that resistor caused when the temperature-rise in the television receiver causes the resistance thereof to exceed a predetermined value; and an average beam current restricting device connected with the output of that temperature-rise detecting device and serving to restrict the average beam current of the picture tube in accordance with said output signal thereby to prevent the temperature in the television receiver from rising to exceed a predetermined value.

Other objects and features of the present invention will be apparent from the detailed description taken in connection with the accompanying drawings, in which.

Figure 1:
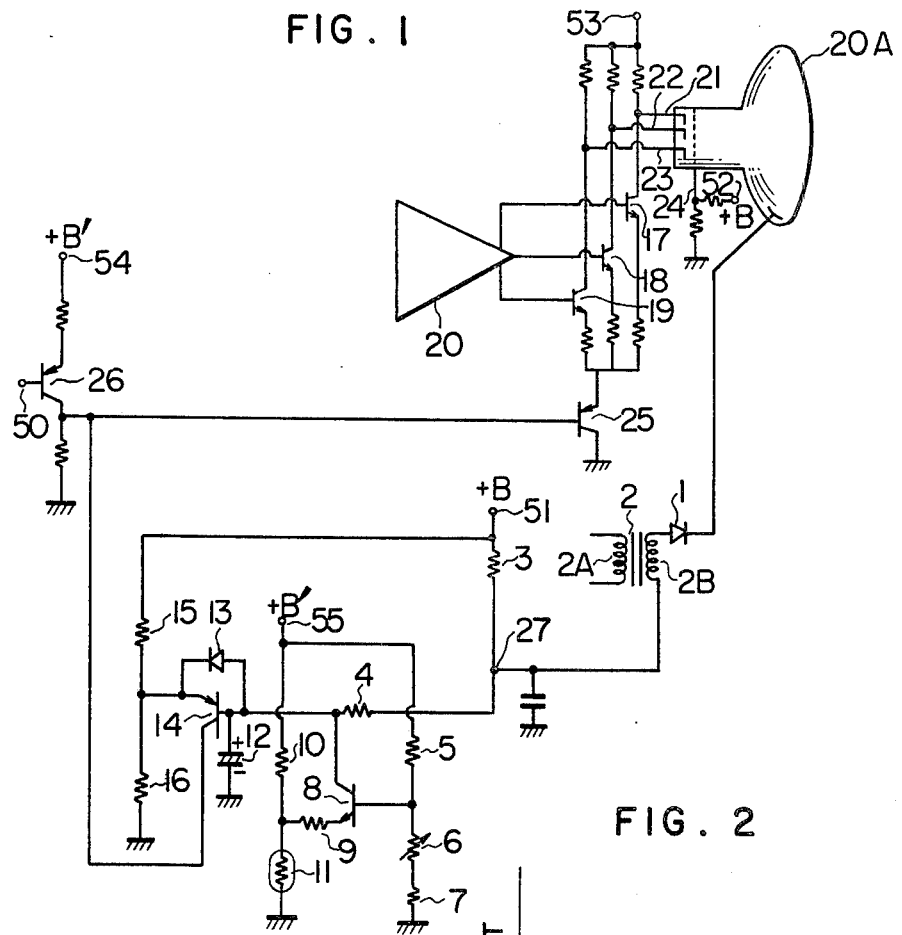
FIG. 1 is a circuit diagram of an embodiment of a temperature-rise preventive apparatus for the television parts according to the present invention.

In FIG. 1, designations of the reference numerals are as follows: 1 a high voltage rectifier diode, 2 a fly-back transformer with a primary winding 2A and with a secondary winding 2B, 3 to 7, 9, 10, 15, and 16 resistors, 11 a thermal variable resistor such as a thermistor, 8 a temperature-rise detecting transistor, 14 a beam current control transistor, 17 to 19 color signal amplifying transistors, 25 and 26 brightness signal control transistors, 12 a compacitor, 13 a diode, 20 a color demodulator, 20A a picture tube, 21 to 23 the respective cathode terminals of the picture tube 20A, 24 a first grid terminal of the picture tube 20A a node for the resistors 3 and 4, and the secondary winding 2B of the fly-back transformer 2, 50 a terminal to which the brightness signal is supplied, 51, 52 and 53 terminals to which dc voltage +B is supplied, and 54 and 55 terminals to which dc voltage +B' is supplied. Brightness signal amplifying transistors 25 and 26 constitute a brightness channel while the color demodulator 20 and the color signal amplifying transistors 17, 18, and 19 constitute a color channel. The respective color difference signals are applied to the base of the transistors 17, 18, and 19, respectively, while the brightness signal is supplied to the respective emitters of the same transistors. The color signal is applied to the respective cathodes 21, 22, and 23 of the picture tube 20A through the corresponding collectors of the same transistors. The voltage applied to the first grid of the picture tube 20A is kept constant. The primary winding 2A of the fly-back transformer 2 is connected to the horizontal output circuit (not shown), while the high voltage impressed on the secondary winding 2B of the fly-back transformer 2 is rectified by the high voltage rectifier diode and then applied to the anode of the picture tube 20A. Resistors 3 and 4, and capacitor 12 constitute an average beam current detecting apparatus, while resistors 15 and 16, diode 13, and beam current control transistor 14 constitute an average beam current restricting device. The terminal 51 is grounded at one end through a series circuit comprising resistors 15 and 16, while connected at the other end to one end of the secondary winding 2B of the fly-back transformer 2, through the resistor 3. The other end of the secondary winding is connected with the anode of the picture tube 20A through a high voltage rectifier diode 1. The node 27 for the resistor 3 and the secondary winding 2B of the fly-back transformer 2, is connected to the base of the transistor 14 through the resistor 4. The base of the transistor 14 is grounded through the capacitor 12, while connected to the emitter of the same through the diode 13. The emitter of the transistor 14 is connected to the node or conjunction point of the resistors 15 and 16. The collector of the same transistor 14 is connected of the base of the transistor 25 and the collector of the transistor 26. Beam current flows into the picture tube 20A through the high voltage rectifier diode 1 and also to the resistor 3. Accordingly, when the beam current increases, the voltage at the conjunction point or node 27 drops. When the voltage at the conjunction point 27 drops to be less than the difference voltage between the +B divided voltage by resistors 15 and 16 and the base-emitter voltage of the transistor 14, the transistor 14 is turned on and the base voltage of the transistor 25 increases. When the base voltage of the brightness signal amplifying transistor 25 increases, the collector voltage of the color signal amplifying transistors 17, 18 and 19, and thus the voltage at the cathode terminals 21, 22, and 23 of the picture tube 20A increases also. For this, the beam current flowing through the picture tube 20A is restricted thereby to restrict the brightness of the picture tube 20A. Diode 13 is a protecting diode for restricting the inverse voltage across the base-emitter of the transistor 14 below the rated voltage for the same transistor when the average beam current approximates to 0. The capacitance 12 is used to eliminate the effect of the instantaneous variation of brightness signal, or of the instantaneous variation of the beam current, upon the base voltage of the transistor 12. The circuit having such function is generally called an automatic brightness restricting circuit. The circuits heretofore mentioned constitute parts of the conventional color television circuitry.

Figure 3:
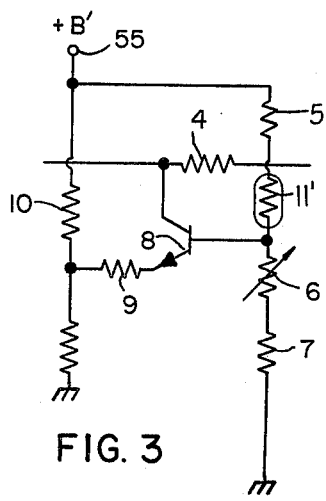
FIG. 3 illustrates a portion of the circuit of FIG. 1 showing the connection of thermal variable resistor in the bias circuit connected to the base of the transistor.

The temperature-rise detecting apparatus is comprised of resistors 5, 6, 7, 9 and 10, the thermal variable resistor 11, and the temperature-rise detecting transistor 8. The terminal 55 is grounded through two channels; one is a series circuit comprising resistors 5 and 7, and variable resistor 6, the other is a series circuit comprising the resistor 12 and the thermal variable resistor 11. The collector of the temperature-rise detecting transistor 8 is connected to the base of the transistor 14, while the base of the transistor 8 is connected to the conjunction point of the resistor 5 and the variable resistor 6. The emitter of the transistor 8 connected to the conjunction point of the resistor 10 and the thermal variable resistor 11 through the resistor 9. As shown in FIG. 3, the thermal variable resistor 11 of FIG. 1 may be replaced by a thermal variable resistor 11' connected in the bias circuit of the base of transistor 8.

The operation of the temperature-rise detecting device will next be described. The emitter of the transistor 8 is biased by the divided voltage by the resistor 10 and the thermal variable resistor 11, while the base thereof is biased by the divided voltage by the resistors 5, 6 and 7. When the ambient temperature of the thermal variable resistor 11 rises, the resistance thereof decreases to cause the emitter voltage of the transistor 8 to drop, thus resulting in turning-on of the transistor 8. The collector current of the transistor 8 flows through the resistors 3 and 4. Accordingly, the base voltage of the transistor 14 is determined by the voltage drop across the resistor 3 produced when the sum of average beam current and the collector of the transistor 8 flows through the resistor 3, and by the voltage drop across the resistor 4 produced by the collector current of the transistor 8 flowing therethrough.

As the temperature in the television receiver, more strictly, the ambient temperature of the thermal variable resistor 11 rises, the collector current of transistor 8 increases so that the transistor 14 is turned on and the collector current thereof increases. Accordingly, with increase of the television inside temperature, the average beam current is more effectively restricted by the average beam current restricting device.

Figure 2:
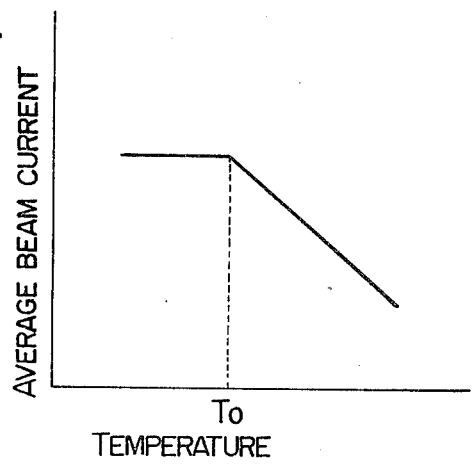
FIG. 2 is a graph showing the relationship between the temperature in the television and average beam current for aiding the explanation of the FIG. 1-circuit operation.

In FIG. 2, the television inside temperature is taken along the abscissa, while the average beam current is taken along the ordinate. The temperature To at which the average beam current begins to decrease corresponds to the television inside temperature causing the transistor 8 to turn on. The operating point of the transistor 8 is adjustable by the variable resistor 6. The slope found above the temperature To depends on the collector current increasing rate of transistor 8 after the turning-on thereof. More specifically, the slope is determined approximately by the temperature coefficient of the thermal variable resistor 11 and the resistance of the resistor 9. That is, suitably varied by changing these values.

As apparent from the foregoing description, in case the average beam current restricting device is designed to be controlled by the output signal of the temperature-rise detecting device, the automatic brightness restricting circuit is not essential. That is, dc voltage may be directly supplied to the conjunction point 27 without the resistor 3.

As described above, when the television inside temperature, more precisely the ambient temperature of the thermal variable resistor 11 rises to exceed the temperature To, the beam current flowing through the parts with small maximum rated temperature such as the fly-back transformer, the high voltage control reactor, etc., also decreases, thereby resulting in reduction of heat evolving of these parts. In other words, the maximum rated temperature of these parts may be reduced until the ambient temperature of the thermal variable resistor 11 reaches the temperature To. Therefore, these parts may be made small in size and thus the cost thereof may be considerably reduced.

What is claimed is:
1. A temperature-rise preventive apparatus for parts of a television receiver comprising:
   a temperature-rise detecting device including a thermal variable resistor provided in the television receiver and producing an output signal in accordance with the resistance variation of said resistor caused when temperature-rise in the television receiver causes the resistance thereof to exceed a predetermined value;
   a brightness channel for brightness signal transmission; and
   an average beam current restricting device connected at the input thereof with the output of said temperature-rise detecting device while at the output thereof with said brightness channel, and serving to vary the dc bias voltage of said brightness channel in accordance with the output signal of said temperature-rise detecting device, thereby to decrease the average beam current in accordance with the temperature-rise below the value of the average beam current prior to the predetermined temperature value being exceeded.

2. A temperature-rise preventive apparatus for the television receiver parts comprising:
   an average beam current detecting device for detecting change of the average beam current;
   a brightness channel for brightness signal transmission;
   an average beam current restricting device whose input is connected to the output of said average beam current detecting device while whose output is connected to said brightness channel for varying a dc bias voltage of the brightness channel in accordance with the output signal of said average beam current detecting device to restrict the average beam current below a given value; and a temperature-rise detecting device being connected to said average beam current detecting device and having a thermal variable resistor whose resistance varies with the change of ambient temperature, said temperature-rise detecting device operatingly varying the output signal of said average beam current detecting device when the ambient temperature as detected by the thermal variable resistor increases to exceed a predetermined temperature, so that the average beam current restricting apparatus reduces the average beam current below the value of the average beam current prior to the temperature exceeding the predetermined value.

3. A temperature-rise preventive apparatus according to claim 2, in which: said average beam current detecting device consists of a resistor and a capacitor, one end of said resistor being connected to a positive dc voltage source while the other end thereof is connected to one end of said capacitor and to the low voltage side terminal of the secondary winding of a fly back transformer, and the other end of said capacitor being grounded, the beam current flowing through said resistor, and the output of said temperature-rise preventive apparatus being obtained from the conjunction point between said capacitor and resistor; and said temperature-rise detecting device consists of a transistor and bias circuits for applying bias voltages to the emitter and the base of said transistor, the collector current of said transistor flowing through the resistor in said average beam current detecting device, the thermal variable resistor being provided in said bias circuits, and the bias circuits being constructed such that said transistor is turned off when the ambient temperature detected by the thermal variable resistor is below a predetermined temperature and the collector current of said transistor increases when the ambient temperature exceeds the predetermined temperature.

4. A temperature-rise preventive apparatus according to claim 1, in which said temperature-rise detecting device further includes a transistor and bias circuits for applying bias voltages to the respective electrodes thereof, said thermal variable resistor being connected in the bias circuit of the emitter electrode thereof.

5. A temperature-rise preventive apparatus according to claim 2, in which said temperature-rise detecting device further includes a transistor and bias circuits for applying bias voltages to the respective electrodes thereof, said thermal variable resistor being connected in the bias circuit of the emitter electrode thereof.

6. A temperature-rise preventive apparatus according to claim 1, in which said temperature-rise detecting device further includes a transistor and bias circuits for applying bias voltages to the respective electrodes thereof, said thermal variable resistor being connected in the bias circuit of the base electrode thereof.

7. A temperature-rise preventive apparatus according to claim 2, in which said temperature-rise detecting device further includes a transistor and bias circuits for applying bias voltages to the respective electrodes thereof, said thermal variable resistor being connected in the bias circuit of the base electrode thereof.

8. A temperature-rise preventive apparatus for parts of television receiver including a picture tube comprising:

a temperature-rise detecting device including a thermal variable resistor provided in said receiver, said resistor having a resistance variable in response to the temperature-rise in said receiver, said detecting device operatingly producing an output signal which varies in accordance with the variation in the resistance of said resistor when the temperature in said receiver exceeds a predetermined temperature value; and an average beam current reduction device connected with an output of said detecting device and serving to reduce the average beam current flow through said picture tube in accordance with said output signal below the value of the average beam current prior to the predetermined temperature value being exceeded so that the greater the temperature-rise, the greater the restriction of the average beam current thereby suppresing temperature-rise of the parts of the receiver caused by the current flowing therethrough.

9. A temperature-rise preventive apparatus according to claim 8, wherein said average beam current reduction device restricts the average beam current so that the average beam current is a non-constant value.

10. A temperature-rise preventive apparatus for parts of a television receiver having a cathode-ray tube comprising:

a temperature-rise detecting means for detecting a temperature-rise in said television receiver;

a signal generator for generating a detecting signal corresponding to the extent of said temperature-rise from a predetermined temperature when a temperature in said television receiver exceeds said predetermined temperature; and average beam current decreasing means coupled between said generator and said cathode-ray tube for decreasing an average beam current at said cathode-ray tube in accordance with said detecting signal below the value of the average beam current flowing in said receiver prior to the predetermined temperature being exceeded, whereby the temperature in said television receiver is prevented from rising by reduction of heat evolving at some of said parts of said receiver caused by said average beam current flowing therethrough.

11. A temperature-rise preventive apparatus for parts of a television reciever having a cathode-ray tube and a television signal source for applying a television signal to said cathode ray tube comprising:

a thermal sensitive element, an impedance of which varies in accordance with ambient temperature variations when the ambient temperature exceeds a predetermined temperature;

detecting means containing a power source for flowing a current through said thermal sensitive element for detecting voltage variations generated across said thermal sensitive element; and average beam current decreasing means coupled between said detecting means and said cathode-ray tube for changing said television signal so that an average beam current is decreased in response to said voltage variations corresponding to said ambient temperature exceeding said predetermined temperature below the value of the average beam current prior to the predetermined temperature being exceeded.

12. A temperature-rise preventive apparatus for television parts according to claim 9, in which a dc bias device is provided for applying a dc bias voltage to said cathode-ray tube, and said average beam current decreasing means changes said dc bias voltage in response to said voltage variations corresponding to said ambient temperature exceeding said predetermined temperature.

13. A temperature-rise preventive apparatus for parts of a television receiver comprising:
a temperature-rise detecting device provided in the television receiver for producing an output signal which varies in accordance with the temperature-rise in said receiver when it exceeds a predetermined temperature value;
an average beam current reduction device coupled with the output signal of said detecting device for reducing the average beam current of said receiver in accordance with the output signal below the value of the average beam current prior to the predetermined temperature value being exceeded, whereby the greater the temperature-rise, the less the average beam current becomes, thereby preventing the temperature in said receiver from rising.

* * * * *